(12) United States Patent
Brown et al.

(10) Patent No.: US 10,397,160 B2
(45) Date of Patent: Aug. 27, 2019

(54) METHOD TO PRE-SELECT FOLDERS TO SYNCHRONIZE DURING INITIAL EMAIL ACTIVATION ON A MOBILE DEVICE

(71) Applicant: BlackBerry Limited, Waterloo (CA)

(72) Inventors: David Andrew Brown, Waterloo (CA); Ronesh Puri, Waterloo (CA); Andrew John Ewanchuk, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 210 days.

(21) Appl. No.: 14/830,319

(22) Filed: Aug. 19, 2015

(65) Prior Publication Data

US 2017/0054667 A1    Feb. 23, 2017

(51) Int. Cl.
G06F 15/16 (2006.01)
H04L 12/58 (2006.01)
H04L 29/08 (2006.01)
H04W 4/12 (2009.01)

(52) U.S. Cl.
CPC .......... *H04L 51/22* (2013.01); *H04L 67/1095* (2013.01); *H04W 4/12* (2013.01); *H04L 51/38* (2013.01)

(58) Field of Classification Search
CPC ....... H04L 51/22; H04L 67/1095; H04W 4/12
USPC ......................................................... 709/206
See application file for complete search history.

(56) References Cited

U.S. PATENT DOCUMENTS

| 6,505,214 | B1 | 1/2003 | Sherman et al. | |
|---|---|---|---|---|
| 6,636,897 | B1* | 10/2003 | Sherman | G06F 16/27 709/248 |
| 2006/0242206 | A1 | 10/2006 | Brezak et al. | |
| 2007/0038712 | A1* | 2/2007 | Affronti | G06Q 10/06 709/206 |
| 2008/0045253 | A1* | 2/2008 | Mousseau | H04L 51/38 455/466 |
| 2008/0109448 | A1* | 5/2008 | Aboel-Nil | G06Q 10/107 |
| 2008/0270548 | A1* | 10/2008 | Glickstein | G06Q 10/107 709/206 |
| 2012/0005283 | A1* | 1/2012 | Provo | G06Q 10/10 709/206 |
| 2013/0041968 | A1* | 2/2013 | Cohen | H04L 51/24 709/206 |

FOREIGN PATENT DOCUMENTS

EP    1422902 A2    5/2004

OTHER PUBLICATIONS

EPO, Extended European Search Report relating to EP application No. 16173596.4, dated Jan. 19, 2017.

* cited by examiner

*Primary Examiner* — Atta Khan
(74) *Attorney, Agent, or Firm* — Rowand LLP

(57) ABSTRACT

A method for synchronizing a mobile device with an email mailbox is described. The method includes: sending a search query to a mail server to identify email messages that are associated with folders of the email mailbox other than an inbox folder; selecting one or more folders of the email mailbox to synchronize on the mobile device based on the identified email messages; and retrieving, from the mail server, one or more email messages associated with the selected folders.

14 Claims, 3 Drawing Sheets

US 10,397,160 B2

METHOD TO PRE-SELECT FOLDERS TO SYNCHRONIZE DURING INITIAL EMAIL ACTIVATION ON A MOBILE DEVICE

TECHNICAL FIELD

The present disclosure relates to synchronization of data on mobile devices and, in particular, to methods for automatically synchronizing email accounts on a mobile device.

BACKGROUND

Modern mobile devices are generally equipped for email access. For example, a mobile device may be loaded with a mail client software application, such as TouchDown™ by Symantec or K-9 Mail, which provides "on-device" access and management of email mailboxes belonging to a user of the device. The device user can read, compose or delete messages for one or more email addresses via a mail client application on the device.

Email mailboxes can often contain a large number of messages that are classified into and reside in any number of distinct mailbox folders. Various factors, such as finite storage capacity of a device, server traffic load and limits on mobile data usage, can make it impractical to retrieve and store all of the messages of an email mailbox on a mobile device. Accordingly, a mail client application on a mobile device may employ techniques to control the synchronization of email data between the mobile device and the device user's email mailboxes.

BRIEF DESCRIPTION OF DRAWINGS

Reference will now be made, by way of example, to the accompanying drawings which show example embodiments of the present application and in which.

DETAILED DESCRIPTION OF EXAMPLE EMBODIMENTS

In one aspect, the present disclosure describes a method for synchronizing a mobile device with an email mailbox on a mail server. The method includes: sending a search query to a mail server to identify email messages that are associated with folders of the email mailbox other than an inbox folder; selecting one or more folders of the email mailbox to synchronize on the mobile device based on the identified email messages; and retrieving, from the mail server, one or more email messages associated with the selected folders.

In another aspect, the present disclosure describes a mobile device comprising a memory, a communications subsystem and a processor coupled to the memory and the communications subsystem, wherein the processor is configured to: send a search query to a mail server to identify email messages that are associated with folders of an email mailbox on the mail server other than an inbox folder; select one or more folders of the email mailbox to synchronize on the mobile device based on the identified email messages; and retrieve, from the mail server, one or more email messages associated with the selected folders.

Other example embodiments of the present disclosure will be apparent to those of ordinary skill in the art from a review of the following detailed description in conjunction with the drawings.

The present disclosure makes reference to "email mailbox". An "email mailbox" will be understood to refer to a remote mail storage on a mail server to which messages are delivered. Typically, an email mailbox is identified by an email address created by or assigned to an individual. Access to an email mailbox is controlled by a mail service provider, and only authenticated users can read, delete or otherwise access the messages of the email mailbox. An email mailbox on a mail server is to be distinguished from a local mail storage which may be used by a mail client application on a mobile device to store the messages retrieved from a corresponding email mailbox.

System Overview

Figure 1:
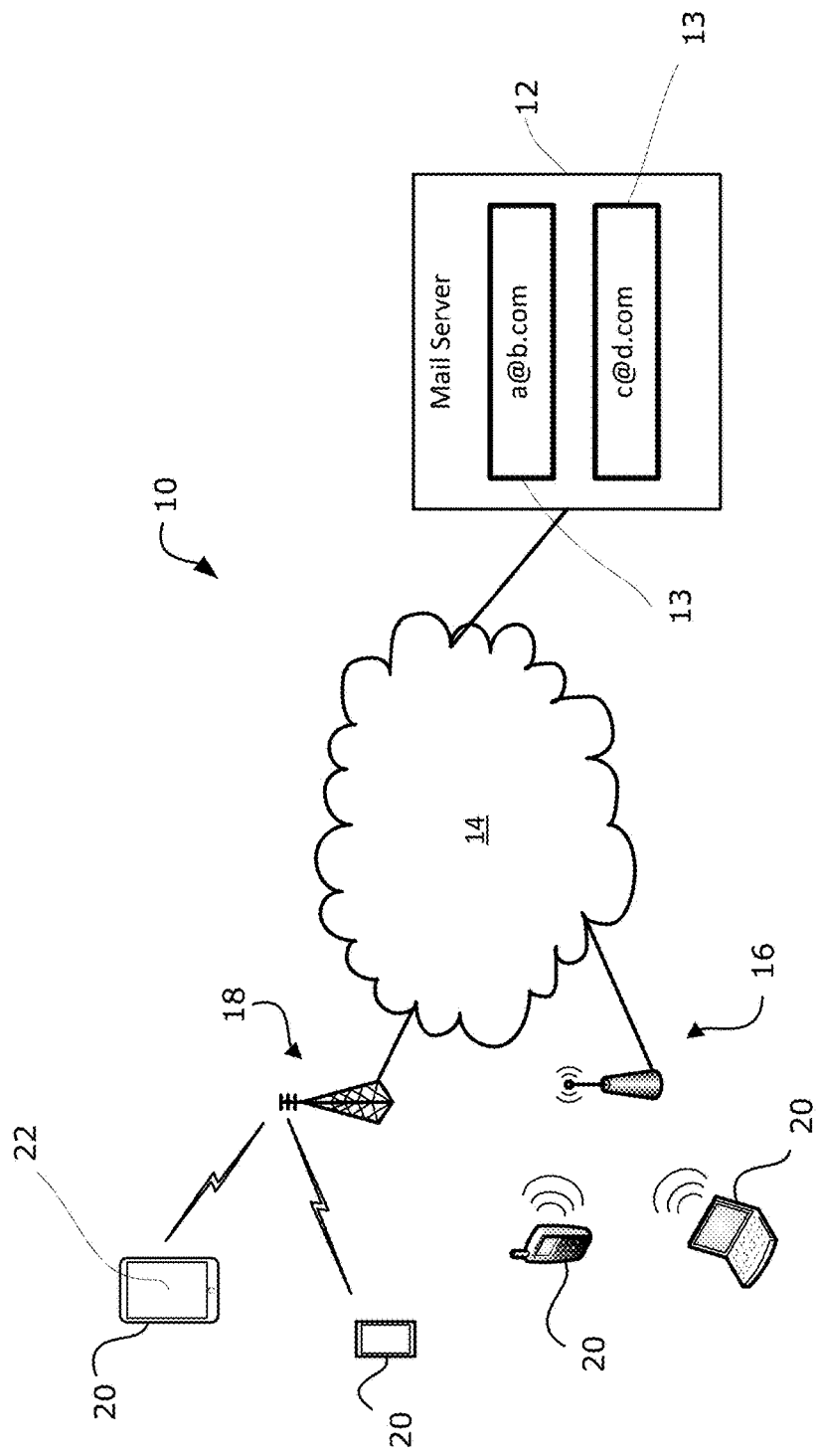
FIG. 1 is a block diagram illustrating an example system for synchronizing a mobile device with an email mailbox on a mail server.

Reference is first made to FIG. 1, which shows in block diagram form an example system 10 for synchronizing a mobile device with an email mailbox on a mail server. The system 10 includes a mail server 12 and one or more mobile devices 20. The mobile devices 20 may include smartphones, tablets, laptops or other electronic devices capable of communicating over wireless networks. The mail server 12 may be a computer or a network of computers. The mobile devices 20 are configured to connect to the mail server 12 using data connections established via one or more networks. In at least some embodiments, the networks may include wireless wide area networks (WWANs) 18. A WWAN 18 implements cellular network technologies, such as LTE, UMTS and GSM, for data communication. The WWAN 18 may be operated by a mobile network service provider which provides subscription packages to users of the mobile devices 20. In some embodiments, the networks may also include a wireless local area network (WLAN) 16, such as a Wi-Fi or WiMAX network, providing wireless connectivity to mobile devices in a local coverage area. As shown in system 10 of FIG. 1, data communication between the mobile devices 20 and the mail server 12 may traverse one or more data networks 14, such as the Internet. It will be appreciated that the data connection between the mail server 12 and the mobile devices 20 may include a number of intermediate devices, including proxy servers, relays, routers, switches and other network equipment.

In at least some embodiments, the mail server 12 may maintain a plurality of email mailboxes 13, each email mailbox corresponding to an email account. The mail server 12 implements a mail transfer agent (MTA) software which handles the transfer of email messages between servers using mail transmission standards such as the Simple Mail Transfer Protocol (SMTP) and/or Extended SMTP (ES-MTP). By way of example, the mail server 12 may be a Microsoft® Exchange™ Server, supporting the use of Exchange ActiveSync® mailbox policies. A message directed to an email mailbox 13 is routed to the mail server 12. For example, the mail server 12 may be identified as a target host, based on the domain name associated with the email mailbox 13, and the message may be sequentially relayed between a series of MTAs until the mail server 12 accepts the incoming message. The final delivery of the message to the recipient email mailbox may be performed by a message delivery agent (MDA), which receives the message from an MTA and saves the message in the relevant mailbox format at the mail server 12.

Once the message is delivered to the local mail server 12, the message is stored for batch retrieval by authenticated mail clients, or mail user agents (MUAs). A mail client application on a mobile device facilitates access and management of messages stored on the mail server 12. In particular, a mail client application provides a platform to access messages delivered to one or more email addresses. In at least some embodiments, a mail client application may implement a protocol for retrieving messages from a mail server, such as Internet Message Access Protocol (IMAP) or Post Office Protocol (POP3). For example, a mail client application can request to download messages from an email mailbox 13 to local storage or to remotely manage the email mailbox 13 on the mail server 12.

An email mailbox 13 on the mail server 12 may include a plurality of mailbox folders 24. Organizing email messages into distinct mailbox folders can facilitate meaningful classification of messages, efficient search of message content, distribution of mail volume and expeditious access. A new folder can be created in the email mailbox 13, either from server-side by an administrator of the mail server 12 or from within a mail client application on a mobile device. By way of example, an administrator of the mail server 12 can create a new folder in the email mailbox 13 by specifying a name and a folder hierarchy (e.g. parent folder) for the new folder. As a further example, an end user of a mail client application, such as Microsoft Outlook®, can create additional folders within the application and the newly created folders may be automatically synchronized with a corresponding Microsoft® Exchange™ server.

In at least some embodiments, the mailbox folders 24 of an email mailbox 13 include an inbox folder. Generally, an inbox folder is the default storage location for incoming messages that are delivered to an email mailbox. In some cases, inbox rules may be defined to redirect incoming messages to one or more mailbox folders other than the inbox folder. Furthermore, messages that are initially received into the inbox folder can be moved to other mailbox folders, either manually or based on predetermined rules for filing messages. For example, rules can be defined for automatically filing messages that are older than a threshold age to a mailbox folder other than the inbox folder. In some cases, a mailbox folder may itself be moved to a different location in the folder hierarchy of the email mailbox, for example, as a sub-folder to an existing mailbox folder.

When a mobile device 20 establishes a connection to the mail server 12, the mobile device 20 may receive information regarding the one or more email mailboxes 13 that are stored on the mail server 12. In particular, the mobile device 20 may obtain a list of all mailbox folders associated an email mailbox 13. In some embodiments, the mobile device 20 may be configured to compare the list of folders of the email mailbox 13 with the set of local mailbox folders that have been set up on the device, for example, within a mail client application.

A mail client application on a mobile device 20 may poll or query the mail server 12 for new message data. In response, the mail server 12 may send any newly-arrived message data or other updates (e.g. messages deleted from an email mailbox, sent messages, etc.). The synchronization poll-and-update may extend to other non-message related items, such as calendars, notes, reminders or data for other applications. In some embodiments, the mail client application may implement a synchronization protocol, such as Microsoft® Exchange ActiveSync®, which provides a real-time push mail solution. A push mail solution can keep a mobile device current over a wireless network connection by notifying the device when new content is ready to be synchronized.

Synchronizing Email on a Mobile Device

Figure 2:
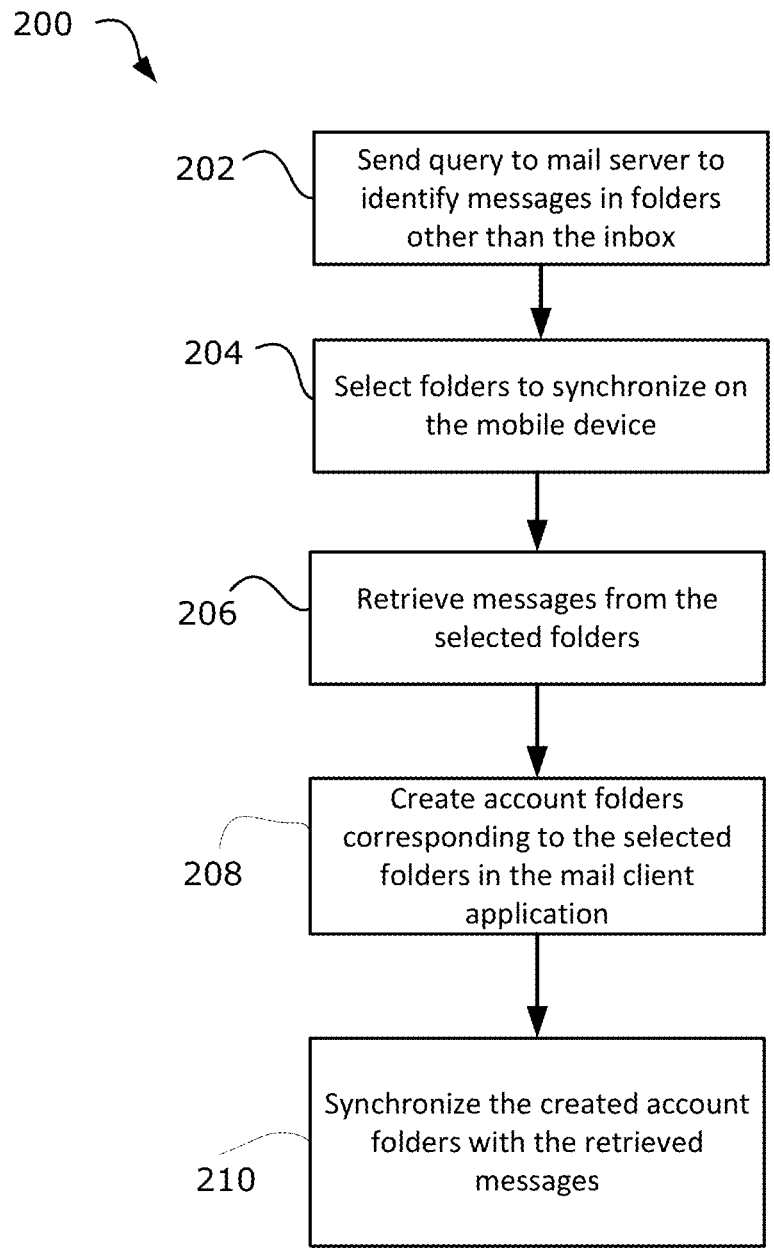
FIG. 2 is a flowchart illustrating an example method of synchronizing a mobile device with an email mailbox on a mail server.

Reference is now made to FIG. 2, which shows, in flowchart form, an example method 200 for synchronizing a mobile device with an email mailbox on a mail server. The method 200 may be implemented by a processor of the mobile device. For example, the method 200 may be performed by a new mobile phone during initial provisioning or activation procedures. In other embodiments, the method 200 may be implemented by the mail server, or partly by the mobile device and partly by the mail server.

The method 200 relates to synchronization of email mailbox data on a mobile device. More specifically, the method 200 may be performed by a mobile device for selectively synchronizing a local mailbox on the mobile device with message data from an email mailbox on a mail server. In at least some embodiments, the method 200 can be implemented to synchronize a local mailbox in a mail client application which has already been initialized and populated with message data from a mail server. In some other embodiments, a mobile device can perform the method 200 during an initial email synchronization process for retrieving messages for the first time from an email mailbox to the device. For example, the method 200 may be executed during an initial setup of an account in a mail client application on the mobile device, where the account represents a local mail storage corresponding to the email mailbox on the mail server.

In operation 202, the mobile device sends a search query to the mail server to identify messages that are associated with folders of the email mailbox other than an inbox folder. That is, a remote search of messages in the email mailbox on the mail server may be performed. In at least some embodiments, the search query can be an open-ended query to search all folders of the email mailbox with the exception of the inbox folder. For example, a search query with empty search parameters can be sent to the mail server by the mobile device. The search query may be used in conjunction with a search filter and/or folder to exclude the inbox folder from a search of the email mailbox. In some other embodiments, the search query may define specific search criteria to apply to a search of the email mailbox. By way of example, in some cases, a maximum number of search results to return may be set. For example, a maximum number can be set at the mail server or specified by the relevant mail transfer protocol. In particular, the email mailbox can be searched to identify a predetermined number of messages that are associated with folders other than the inbox folder. The value of the predetermined number may be a design choice and can be selected by a user of the mobile device or fixed by a server administrator based on characteristics and restrictions of the mailbox search mechanism. Various other search criteria may be provided in the search query. For example, a date range may be specified by the search query to limit the search to messages that were sent during a specific date range.

Once the search of the email mailbox is completed, the results of the search can be logged at the mail server. The search results may identify a plurality of messages in the email mailbox that reside in folders other than the inbox folder. In at least some embodiments, the identified email messages may include one or more of the most recently received messages of the email mailbox that are associated with folders other than the inbox. In particular, an open-ended search query to the mail server may return those messages which have the latest received dates and/or times among the messages in folders other than the inbox.

The logged results of the search may be stored at the mail server or transmitted to the mobile device as a response to the search query to the mail server. The search results may indicate various properties associated with the messages identified in the search. For example, the properties of a message that may be identified in a results set include, without limitation, mailbox folder identifier, message size, date sent/received, header information, subject, sender, recipients and count and size of attachments. In at least some embodiments, the search results log may contain a list of message identifiers and index one or more properties for each of the identified messages.

In operation 204, one or more folders of the email mailbox on the mail server may be selected for synchronizing on the mobile device. That is, one or more mailbox folders are selected such that at least portions of the content of the selected folders (i.e. messages contained in the folders) may be retrieved and stored locally. In many cases, it may be desirable to selectively synchronize local mailbox folders by retrieving messages from a subset of all folders of the email mailbox on the mail server, rather than synchronizing with all folders of the email mailbox. By selecting a subset of folders to synchronize, a mobile device may receive, from the mail server, those messages that are likely to be of higher priority or greater utility to a user of the device, before receiving other messages of the email mailbox.

By way of illustration, the method of selective synchronization of email data, as described in the present application, can be employed during an initial email activation procedure on a mobile device. When configuring a new device for an email account corresponding to an email mailbox belonging to a user of the device, the device does not contain any data about the user or the user's pattern of use of her email mailbox. In particular, for a new device, information relating to the usage pattern of an email mailbox (e.g. most frequently used/accessed folders, etc.) may not be available. Where an email mailbox contains a high volume of messages that are distributed into a large number of distinct mailbox folders, it may be particularly useful to apply selective synchronization based on identification of usage patterns of the email mailbox.

In at least some embodiments, the selection of folders to synchronize locally on the mobile device is based on the messages identified in the search of the email mailbox in folders other than the inbox folder. More specifically, the properties associated with the messages identified in operation 202 may be used to determine, at least in part, usage patterns of the email mailbox and to provide guidance as to which folders should be selected for synchronization.

The search results from the search query to the mail server to identify messages associated with folders other than the inbox may indicate an associated folder for each of the identified messages. In some embodiments, the mobile device may select the mailbox folders to synchronize on the device based on determining, for at least one folder of the email mailbox other than the inbox, a count of the identified messages that are associated with that folder. For example, for each of the folders that are associated with the messages identified in the search of the email mailbox, a count of the identified messages residing the folder may be maintained. By comparing the counts of the identified messages for the mailbox folders (other than the inbox folder), it may be possible to determine which folders of the email mailbox are accessed and/or used most frequently. Accordingly, the mobile device may select the mailbox folders to synchronize on the device by, for example, selecting a set of folders that have the highest count.

In some embodiments, the selection of a mailbox folder for synchronization may be based on the date of access of that folder. Based on the results set of messages identified in the search of the email mailbox in operation 202, the date received or the date of access for an identified message may be known to the mobile device. By tracking the date received or the date of access for the identified messages associated with a mailbox folder, the mobile device may be able to determine the folders that are associated with the identified messages that were recently accessed. The folders associated with recently accessed or recently received messages may sometimes be of primary concern to a user of the mobile device. For example, a set of recently received messages that were automatically filed to a particular folder different from the inbox may require immediate attention or resolution. In such case, selecting that particular folder for synchronization on the device may allow a user to promptly access (or at least be notified of) the urgent messages associated with the folder.

Variants of these techniques for selecting folders to synchronize on the device may be available. Furthermore, a plurality of factors relating to usage patterns of the email mailbox may be considered in combination when selecting the mailbox folders for synchronization on the device. That is, two or more factors relating to usage patterns of the email mailbox may be considered together. In such cases, the device may attribute different weights to the plurality of factors when making a selection of the folders, according to the relative importance of those factors. By way of example, for a mailbox folder other than the inbox, the count of the messages identified from the search of the email mailbox that are associated with that folder may be given greater weight than the dates of last access associated with the identified messages of that folder. Accordingly, in some embodiments, the selection of the folders to synchronize on the device may proceed by ranking the mailbox folders (other than the inbox) based on a score associated with each of the folders, where the score for a folder is derived from a weighting of two or more factors relating to mailbox usage patterns.

Once the folders for synchronization on the device are selected, the mobile device can be synchronized with the selected folders of the email mailbox. In at least some embodiments, a local mailbox in a mail client application on the mobile device may be synchronized with the content of the selected folders. In particular, a local mailbox on the device may be populated with messages associated with the selected folders. For example, the mobile device may send a request to the mail server to retrieve one or more messages residing in the selected folders of the email mailbox. Depending on synchronization rules or policies, the device may either retrieve all messages or only a subset of the messages from the selected folders. A user of the device may, in some embodiments, be able to configure synchronization rules or policies by selecting options on a graphical user interface (GUI) associated with a local mailbox and/or mail client application. The user may also be able to select a "sync window" using the GUI, in order to specify a synchronization period for email (i.e., to limit the retrieval of messages to those messages that were received during the synchronization period). For example, a sync window can be set, by a device user, to a period of 1, 3, 7, 30, 90 or 180 days.

In some embodiments, only header portions of messages from the selected folders may be retrieved to a local mailbox of the mobile device. The header portion, which may include information such as subject, "To" field, "From" field, "CC" field, etc.), provide technical details about a message and are sent as metadata from the mail server. In other embodiments, at least a portion of the message body and/or attachments of a message may additionally be retrieved.

Even amongst the selected folders of the email mailbox, some folders may have greater importance or utility for a device user. In order to recognize such distinctions between selected folders, the one or more messages associated with the selected folders may be retrieved according to an order. In some embodiments, the order of retrieval of a message from the mail server may be determined by the mailbox folder that is associated with the message. For example, messages associated with a mailbox folder that is deemed to be of high importance or urgency may be retrieved before the messages in folders representing lower levels of importance or urgency. In some cases, a device user may be able to schedule the retrieval of messages (or portions of messages) in accordance with a determined order.

The selected folders of the email mailbox may contain a large number of messages. Accordingly, it may be useful to determine an order or priority of retrieval of messages of the selected mailbox folders. For example, messages of the selected folders that are likely to be highly relevant for a device user may be retrieved before other messages of the selected folders. In at least some embodiments, the order of retrieval of a message from the mail server may depend on one or more indicators associated with the message. More specifically, one or more indicators associated with a message from a selected folder may inform the determination of an order or priority of retrieving the message from the mail server. In some embodiments, the one or more indicators may specify inbound mail actions that have been performed for a message. For example, the indicators associated with a message may indicate that the message has been replied to or forwarded to another email mailbox. In particular, an indicator for a message may specify whether the message is part of an email conversation thread. As a further example, a flag that is associated with a message may be an indicator for the message. A message may be flagged by an email user for several reasons. For example, a flag may indicate that a message is of high priority or low priority. A flag associated with a message may also indicate to the email user that a follow-up action is required for the message. The presence and/or the nature of flags for a message can serve as indicators associated with the message. One or more such indicators associated with a message may signal that the message should be prioritized and retrieved earlier than other messages of the selected folders.

It will be appreciated that although the above description presumes that the mobile device evaluates which messages (or portions thereof) and in what order to retrieve messages from the selected mailbox folders, in some embodiments, these decisions may be made by the mail server. For example, the mail server itself may select the mailbox folders to synchronize on the mobile device, based on techniques for estimating usage patterns of the email mailbox, as described above. As a further example, the mobile device may transmit a list of mailbox folders selected by the device to the mail server, and the mail server may determine which of the messages (or portions of messages) from the selected folders to send to the mobile device and/or the order in which to send the messages (or portions thereof).

In at least some embodiments, the method 200 may be employed to facilitate initial configuration of an account in a mail client application on a mobile device, where the account corresponds to an email mailbox on a mail server. When activating an email account in a mail client application on a new device, or when adding an email account in a newly installed mail client application on a device, an initial synchronization with an email mailbox on a remote mail server may be preferred or required. A mobile device may perform the method 200 to configure a local mailbox in a mail client application on the device by automatically synchronizing with a remotely stored email mailbox.

When the mailbox folders to be synchronized on the mobile device are selected, the device may create account folders for the account in the mail client application, the account folders corresponding to the selected folders of the email mailbox. More specifically, for each of the selected mailbox folders, a corresponding local folder may be automatically created in the mail client application. For example, the mail client application may contain an account corresponding to the email mailbox (i.e., email address), and upon selecting the mailbox folders to synchronize on the device, local folders corresponding to the selected mailbox folders may be generated for the account in the mail client application.

The created account folders are then populated, or synchronized with the email mailbox, in operation 210, by storing the retrieved messages (or portions thereof) in the created account folders. Just as for the retrieval of messages from the selected folders, the populating of the created account folders may be performed in a specific order. For example, the account folders corresponding to those selected mailbox folders that are deemed to be of higher importance may be populated with retrieved messages before the other account folders of the mail client application.

Example Mobile Device

Figure 3:
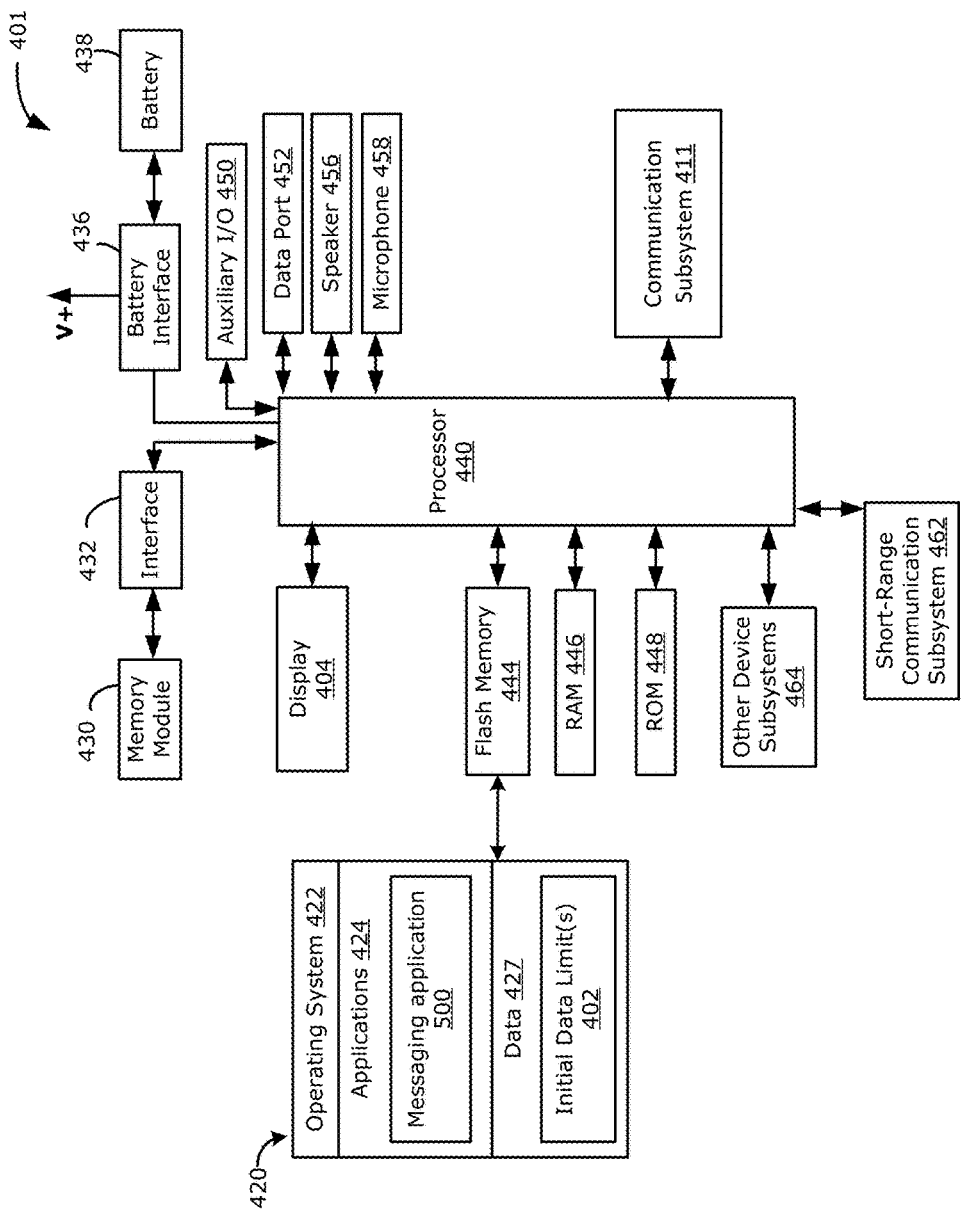
FIG. 3 is a block diagram illustrating components of an example mobile device in accordance with embodiments of the present disclosure Like reference numerals are used in the drawings to denote like elements and features.

Reference will now be made to FIG. 3 which illustrates an example electronic device 401. In the illustrated example embodiment, the electronic device 401 is a mobile communication device. In at least some example embodiments, the mobile communication device is a two-way communication device having data and possibly voice communication capabilities, and the capability to communicate with other computer systems; for example, via the Internet.

The electronic device 401 of FIG. 3 includes a housing (not shown) which houses components of the electronic device 401. Internal components of the electronic device 401 may be constructed on a printed circuit board (PCB). The electronic device 401 includes a controller including at least one processor 440 (such as a microprocessor) which controls the overall operation of the electronic device 401. The processor 440 interacts with device subsystems such as a wireless communication subsystem 411 for exchanging radio frequency signals with a wireless network to perform communication functions. The processor 440 interacts with additional device subsystems including one or more input interfaces 406 (such as a keyboard, one or more control buttons, one or more microphones 458, a gesture sensor 461, and/or a touch-sensitive overlay associated with a touchscreen display), flash memory 444, random access memory (RAM) 446, read only memory (ROM) 448, auxiliary input/output (I/O) subsystems 450, a data port 452 (which may be a serial data port, such as a Universal Serial Bus (USB) data port), one or more output interfaces (such as a display 404 (which may be a liquid crystal display (LCD)), one or more speakers 456, or other output interfaces), a short-range communication subsystem 462, and other device subsystems generally designated as 464.

The electronic device 401 may include a touchscreen display in some example embodiments. The touchscreen display may be constructed using a touch-sensitive input surface connected to an electronic controller. The touch-sensitive input surface overlays the display 404 and may be referred to as a touch-sensitive overlay. The touch-sensitive overlay and the electronic controller provide a touch-sensitive input interface and the processor 440 interacts with the touch-sensitive overlay via the electronic controller. That is, the touchscreen display acts as both an input interface and an output interface.

The electronic device 401 may communicate with any one of a plurality of fixed transceiver base stations of the wireless network within its geographic coverage area using the communication subsystem 411. The electronic device 401 may send and receive communication signals over the wireless network after the required network registration or activation procedures have been completed.

In some example embodiments, the auxiliary input/output (I/O) subsystems 450 may include an external communication link or interface, for example, an Ethernet connection. The communication subsystem 411 may include other wireless communication interfaces for communicating with other types of wireless networks; for example, Wi-Fi networks.

In some example embodiments, the electronic device 401 also includes a removable memory module 430 (typically including flash memory) and a memory module interface 432. Network access may be associated with a subscriber or user of the electronic device 401 via the memory module 430, which may be a Subscriber Identity Module (SIM) card for use in a GSM network or other type of memory module for use in the relevant wireless network type. The memory module 430 may be inserted in or connected to the memory module interface 432 of the electronic device 401.

The electronic device 401 may store data 427 in an erasable persistent memory, which in one example embodiment is the flash memory 444. In various example embodiments, the data 427 may include service data having information required by the electronic device 401 to establish and maintain communication with the wireless network. The data 427 may also include user application data such as email messages, address book and contact information, calendar and schedule information, notepad documents, image files, and other commonly stored user information stored on the electronic device 401 by its user, and other data.

The data 427 stored in the persistent memory (e.g. flash memory 444) of the electronic device 401 may be organized, at least partially, into a number of databases or data stores each containing data items of the same data type or associated with the same application. For example, email messages, contact records, and task items may be stored in individual databases within the electronic device 401 memory.

The electronic device 401 also includes a battery 438 as a power source, which is typically one or more rechargeable batteries that may be charged, for example, through charging circuitry coupled to a battery interface 436 such as the serial data port 452. The battery 438 provides electrical power to at least some of the electrical circuitry in the electronic device 401, and the battery interface 436 provides a mechanical and electrical connection for the battery 438.

The battery interface 436 is coupled to a regulator (not shown) which provides power V+ to the circuitry of the electronic device 401.

The short-range communication subsystem 462 is an additional optional component which provides for communication between the electronic device 401 and different systems or devices, which need not necessarily be similar devices. For example, the short-range communication subsystem 462 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications may be installed on the electronic device 401 during or after manufacture. Additional applications and/or upgrades to an operating system 422 or software applications 424 may also be loaded onto the electronic device 401 through the wireless network, the auxiliary I/O subsystem 450, the data port 452, the short-range communication subsystem 462, or other suitable device subsystems 464. The downloaded programs or code modules may be permanently installed; for example, written into the program memory (e.g. the flash memory 444), or written into and executed from the RAM 446 for execution by the processor 440 at runtime.

The processor 440 operates under stored program control and executes software modules 420 stored in memory such as persistent memory; for example, in the flash memory 444. As illustrated in FIG. 3, the software modules 420 may include operating system software 422 and one or more additional applications 424 or modules such as, for example, a mail client application 500. In the example embodiment of FIG. 3, the mail client application 500 is illustrated as being implemented as a stand-alone application 424, but in other example embodiments, the mail client application 300 could be implemented as part of the operating system 422 or another application 424.

The mail client application 500 is configured to connect to the remote mail server and to obtain new message data from the server. It further provides a user interface for rendering on the display 404 to display message content and to receive user input in relation to the message content.

While the present application includes some descriptions of methods, a person of ordinary skill in the art will understand that the present application is also directed to various apparatus such as a handheld electronic device and a server. The handheld electronic device and the server include components for performing at least some of the example aspects and features of the described methods, be it by way of hardware components (such as the memory and/or the processor), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present disclosure are not limited to any particular operating system, mobile device architecture, server architecture, Internet standard protocol or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method implemented by a processor of a mobile device for synchronizing the mobile device with an email mailbox on a mail server, the method comprising:
generating a search query for execution at the mail server to identify a predetermined number of most recently received email messages that are currently stored on the mail server and that were previously moved from an inbox folder associated with the email mailbox to be filed in at least one non-inbox folder of the email mailbox, the search query being set to exclude messages currently stored in the inbox folder;
transmitting the search query to the mail server;
selecting one or more first non-inbox folders of the email mailbox on the mail server to synchronize locally on the mobile device, the selecting including:
for each of the non-inbox folders, attributing weights to a plurality of usage pattern metrics for that non-inbox folder, the plurality of usage pattern metrics including a count of identified email messages associated with that non-inbox folder and a date of last access for identified email messages associated with that non-inbox folder, and
selecting the one or more first non-inbox folders to synchronize locally based on the weighted usage pattern metrics for the non-inbox folders of the email mailbox;
retrieving, from the mail server, one or more email messages residing in the selected first non-inbox folders on the mail server;
creating account folders for an account corresponding to the email mailbox in a mail client application on the mobile device, the account folders corresponding to the selected first non-inbox folders of the email mailbox on the mail server; and
synchronizing the created account folders with at least portions of the retrieved email messages.

2. The method of claim 1, wherein selecting the one or more first non-inbox folders of the email mailbox comprises identifying those non-inbox folders associated with one or more of the identified email messages that were recently accessed.

3. The method of claim 1, wherein the method is executed during an initial setup of an account in a mail client application on the mobile device, the account corresponding to the email mailbox.

4. The method of claim 1, wherein retrieving the one or more email messages associated with the selected first non-inbox folders comprises retrieving only header portions of the email messages.

5. The method of claim 1, wherein retrieving the one or more email messages associated with the selected first non-inbox folders comprises retrieving email messages based on a predefined sync window.

6. The method of claim 1, wherein the one or more email messages associated with the selected first non-inbox folders are retrieved according to an order and wherein an order of retrieval of an email message is determined based on a non-inbox folder of the email mailbox associated with that email message.

7. The method of claim 1, wherein the one or more email messages associated with the selected first non-inbox folders are retrieved according to an order and wherein an order of retrieval of an email message is determined based on one or more indicators associated with the email message.

8. A mobile device, comprising:
a memory;
a communications subsystem; and
a processor coupled with the memory and the communications subsystem, the processor being configured to:
generate a search query for execution at a mail server to identify a predetermined number of most recently received email messages that are currently stored on the mail server and that were previously moved from an inbox folder associated with the email mailbox to be filed in at least one non-inbox folder of the email mailbox, the search query being set to exclude messages currently stored in the inbox folder;
transmit the search query to the mail server;
select one or more first non-inbox folders of the email mailbox on the mail server to synchronize locally on the mobile device, by:
for each of the non-inbox folders, attributing weights to a plurality of usage pattern metrics for that non-inbox folder, the plurality of usage pattern metrics including a count of identified email messages associated with that non-inbox folder and a date of last access for identified email messages associated with that non-inbox folder, and
selecting the one or more first non-inbox folders to synchronize locally based on the weighted usage pattern metrics for the non-inbox folders of the email mailbox;
retrieve, from the mail server, one or more email messages residing in the selected first non-inbox folders on the mail server;
create account folders for an account in a mail client application, the account folders corresponding to the selected first non-inbox folders of the email mailbox on the mail server; and
synchronize the created account folders with at least portions of the retrieved email messages.

9. The mobile device of claim 8, wherein selecting the one or more first non-inbox folders of the email mailbox comprises identifying those non-inbox folders associated with one or more of the identified email messages that were recently accessed.

10. The mobile device of claim 8, wherein retrieving the one or more email messages associated with the selected first non-inbox folders comprises retrieving only header portions of the email messages.

11. The mobile device of claim 8, wherein retrieving the one or more email messages associated with the selected first non-inbox folders comprises retrieving email messages based on a predefined sync window.

12. The mobile device of claim 8, wherein the one or more email messages associated with the selected first non-inbox folders are retrieved according to an order and wherein an order of retrieval of an email message is determined based on a non-inbox folder of the email mailbox associated with that email message.

13. The mobile device of claim 8, wherein the one or more email messages associated with the selected first non-inbox folders are retrieved according to an order and wherein an order of retrieval of an email message is determined based on one or more indicators associated with the email message.

14. The method of claim 1, wherein the selecting further comprises determining a ranking of the one or more non-inbox folders associated with the identified email messages based on scores obtained from the weighted usage pattern metrics for the non-inbox folders.

\* \* \* \* \*